United States Patent [19]

Kao

[11] Patent Number: 5,313,631
[45] Date of Patent: May 17, 1994

[54] DUAL THRESHOLD SYSTEM FOR IMMEDIATE OR DELAYED SCHEDULED MIGRATION OF COMPUTER DATA FILES

[75] Inventor: Ping-Hui Kao, Ft. Collins, Colo.

[73] Assignee: Hewlett-Packard Company, Palo Alto, Calif.

[21] Appl. No.: 703,561

[22] Filed: May 21, 1991

[51] Int. Cl.$^5$ .................................................. G06F 13/00
[52] U.S. Cl. ................................... 395/600; 345/425; 364/967.5; 364/962.4; 364/DIG. 2
[58] Field of Search .................. 364/DIG. 1, DIG. 2; 345/600, 425

[56] References Cited

U.S. PATENT DOCUMENTS

| | | | |
|---|---|---|---|
| 4,414,644 | 11/1983 | Taxler | 395/425 |
| 4,463,424 | 7/1984 | Mattson et al. | 395/425 |
| 4,947,319 | 8/1990 | Bozman | 395/700 |
| 5,051,887 | 9/1991 | Berger et al. | 395/425 |
| 5,134,563 | 7/1992 | Tayler et al. | 395/250 |
| 5,150,472 | 9/1992 | Blank et al. | 395/425 |

OTHER PUBLICATIONS

Stumm et al. "Algorithms Implementing Shared Memory", Computer, May, 1990 p. 54-64.
Bennett et al. "Adaptive Software Cache Management for Distributed Shared Memory Architectures", IEEE CH 2887-8/90/0000/0125.
Nitzberg et al., "Distributed Shared Memory:A Survey of Issues and Algorithms", Computer, Aug. 1991, pp. 52-60.
Cristman, R. D., *Experience with File Migration*, Report #LA 9014-MS, UC-32 Los Alamos NAT Laboratories, 1981 pp. 1-13.
Arneson, D. A., "Development of Omniserver", Tenth IEEE Symp on Mass Storage Systems, IEEE Comp. Soc. Press, 1990 pp. 88-93.
Thanhardt et al. "File Migration in the NCAR Mass Storage System" IEEE Symposium on Mass Storage Systems, 1988 pp. 114-121.
Anna Hac, "A Distributed Algorithm for Performance Improvement Through File Replication, File Migration, and Process Migration" IEEE Transactions on Software Engineering, vol. 13 No. 11, Nov. 1989, pp. 1459-1470.

*Primary Examiner*—Thomas C. Lee
*Assistant Examiner*—Paul R. Lintz

[57] ABSTRACT

A system that places a statistical collection routine, which tracks file usage, within the path lookup process of an operating system. A statistic summarization process runs as a task of the operating system and periodically accesses the statistics collected by the statistics collection routine and updates a database. A file migration process is scheduled to run periodically to examine the database information. Files that have a predetermined usage during the time may be migrated, based on user criteria, between a primary, high speed, storage device and a secondary, slow speed, storage device. The secondary storage device might be a network file server attached to a local area network, a read-only device, or other storage device.

17 Claims, 5 Drawing Sheets

DUAL THRESHOLD SYSTEM FOR IMMEDIATE OR DELAYED SCHEDULED MIGRATION OF COMPUTER DATA FILES

FIELD OF THE INVENTION

This invention relates to computer systems and more particularly to operating system software within such computer systems. Even more particularly, the invention relates to operating system software for dynamically moving files between secondary storage and primary storage within a computer system or between networked computers.

BACKGROUND OF THE INVENTION

With the functionality of software increasing with each release of an operating system, the overall size of the software is also increasing. This increase in size causes several problems.

The first problem caused by larger software is that the minimum requirement for disk space is increasing. The usable minimum configuration of a system can no longer fit easily into the disk provided with an entry system; that is, the first system a user would buy. This problem has been solved in the prior art by increasing the size of the disk on the entry level systems. This, of course, increases the price of the system, making it more and more difficult for users to buy a first computer system.

A second problem is the down time of the system while it is being updated from one release of the software to another. As the operating system gets larger and the software gets larger, this down time gets longer. This is lost time to a user, so they wish to minimize the time needed to perform an upgrade. The prior art solution to this problem is to use a faster computer, which also raises the price of the computer system. Furthermore, this prior art solution is of no value to existing computer systems that are already installed.

A third problem caused by this increasing software size is disk efficiency. Although the amount of software required is large, only a fraction is used regularly. The majority of files are used less than a few times a week, and sometimes not used at all during a week or a longer period of time. The prior art solution to this problem is to remove the files that are rarely used, and when they are needed, load them from a backup device. This involves considerable effort on the part of the user and is, therefore, not a very practical solution.

There is need in the art then for a system that will reduce the size of the high speed disk storage needed for a computer system. There is further need in the art for such a system that will reduce the amount of time necessary to update a system with a new release of software. A still further need in the art is for such a system that will improve the overall efficiency of the high speed storage device on a computer system. The present invention meets these and other needs.

SUMMARY OF THE INVENTION

It is an aspect of the present invention to dynamically migrate files between primary and secondary storage devices.

It is another aspect of the invention to maintain statistics on usage of files on primary storage devices.

Another aspect of the invention is to migrate a file based on the number of access to the file within a time period.

Yet another aspect of the invention is to migrate a file based on the accumulated values derived from the access frequency of the file during a given time period.

A further aspect of the invention is to utilize either slow disk devices or a network file server as secondary storage.

A still further aspect of the invention is to detect that a new version of a file has been placed on secondary storage and update the user's primary storage, at the user's option.

The above and other aspects of the invention are accomplished in a system that places a statistical collection routine within the path lookup process of an operating system. The statistics collection routine tracks each time a file is accessed. A statistics summarization process runs as a task of the operating system and periodically accesses the statistics collected by the statistics collection routine. The statistics summarization process updates a database that maintains information showing how often each file is accessed.

A file migration process is scheduled to run periodically to examine the database information. Files that have very low usage during the time may be migrated out, based on user criteria, from a primary, high speed, storage device to a secondary, slow speed, storage device. When a file is migrated out, a symbolic link is defined for the file between the primary and secondary storage devices. This symbolic link is used by the operating system to provide transparent access to the file on secondary storage. Also, if a file has been accessed very frequently, it may be migrated in from the secondary storage device to the primary storage device, thus replacing the symbolic link with a copy of the file.

The secondary storage device might be a read-only device such as a CDROM optical storage device. If this type of device is being used for secondary storage, files may only migrate from secondary storage into primary storage when they have high usage. Because the system cannot write to a read-only device, files could not be copied from primary storage to secondary storage. If the files have changed, they would be left on primary storage, regardless of usage. If they have not changed, migration to secondary storage is accomplished by simply deleting them from primary storage, and defining a symbolic link to the file on secondary storage.

Alternatively, the secondary storage device could be a network file server attached to a local area network. When a network file server is used as the secondary device, a file that is not available on the primary storage device is read directly over the network via the symbolic link, or, if usage is high, the file is migrated in to primary storage.

When the operating system is loading ("bootstrapping"), it compares the version of the files on secondary storage to the version of the files on the primary storage device, and if the secondary storage files have been updated to a newer version, the user is given the option of replacing the files on the primary storage device. This allows the operating system to be easily upgraded. Since the files needing to be upgraded are only a fraction of the whole, the upgrade time is shortened.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

The following terms are used in the description of the preferred embodiment:

Primary storage: One or more fast disks used as the main disk storage for a computer system. A typical example is a high speed magnetic "hard disk".

Secondary storage: One or more slower disk storage devices which usually have large storage capacities. These may be located in a file server computer system accessed via a local area network (LAN). A typical example is a CD-ROM optical storage device.

Symbolic link: A link between the file name on the primary device and the actual file on the secondary device. Accesses to the file on the primary device will automatically be redirected to the actual file on the secondary device, through the symbolic link, without informing the user.

Migration: The movement of files between primary and secondary storage.

Migrate in: Copying of a file from secondary storage to primary storage to replace a symbolic link.

Migrate out: Removing a file from primary storage and setting up a symbolic link to point to the copy on secondary storage.

Path lookup: A function performed by the operating system when the operating system is given a file name. The function examines a set of directories to locate the file.

Usage Value A number used to indicate the frequency of usage of a file.

No-Return file: A file that cannot be migrated out after its contents have been changed.

Figure 1:
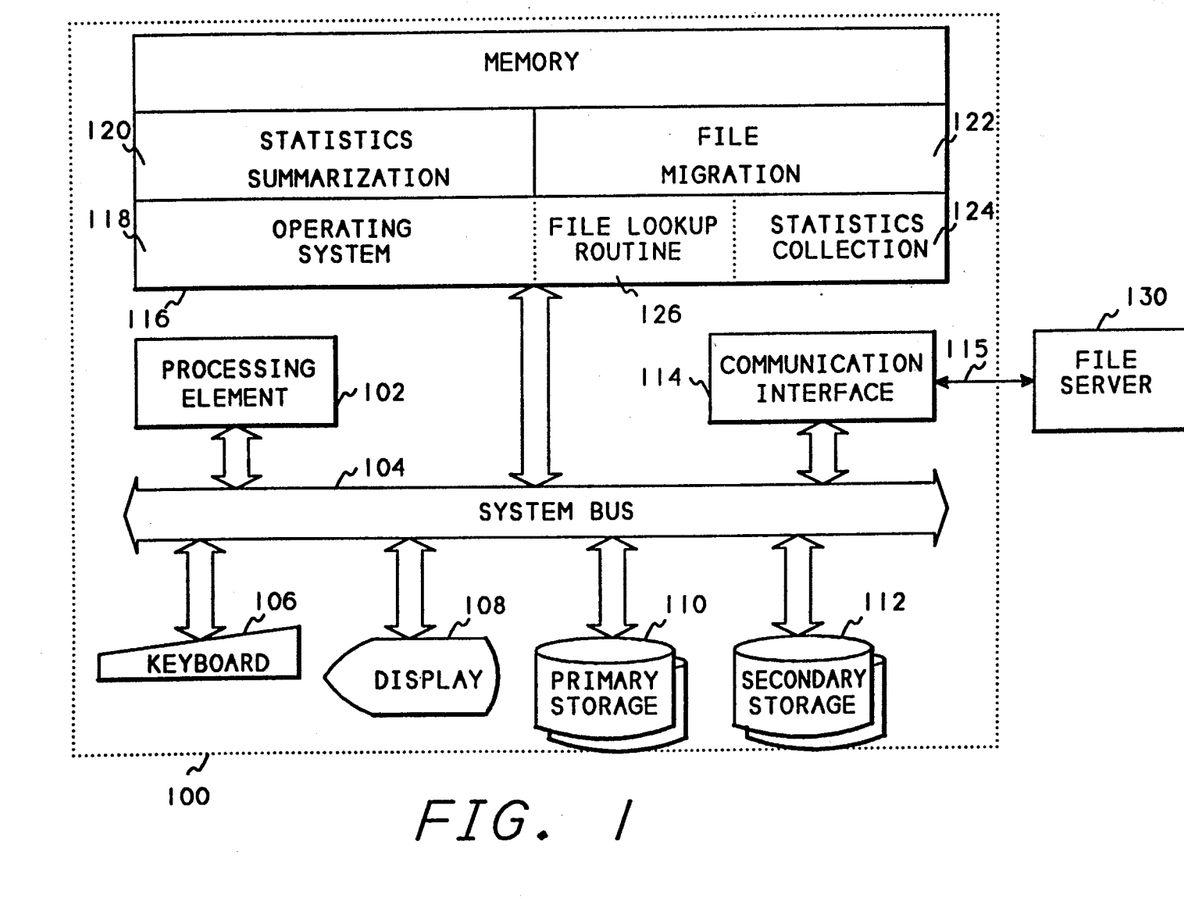
FIG. 1 shows a block diagram of a computer system incorporating the present invention.

FIG. 1 shows a block diagram of a computer system incorporating the present invention. Referring now to FIG. 1, a computer system 100 contains a processing element 102. The processing element 102 communicates to other elements of the system over a system bus 104. A keyboard 106 is used to allow a user of the computer system to input information to the computer system 100 and a display 108 is used by the computer system 10 to display information for the user. A primary disk storage device 110, which would typically be one or more high speed magnetic "hard disks", is used to store the files that are often used by the computer system. A secondary storage device 112, which might typically be one or more CDROM optical storage devices, is used to store system software that is typically updated when a new release of the operating system is installed. A communications interface 11 is used by the computer system 100 to attach to a local area network 115. The local area network 115 also connects to a file server 130 which may be used in place of the secondary storage device 112.

A memory 116 contains an operating system 118. Within the operating system 118, a file lookup routine 126 calls a statistics collection routine 124 which collects statistics on the usage of files on the primary storage device 110. A statistics summarization process 120 runs as a task of the operating system 118 to periodically summarize the statistics collected by the statistics collection routine 124. The statistics summarization process 120, after collecting the statistics, writes the statistics into a database file on the primary storage device 110. A file migration process 122 also runs as a task of the operating system 118. The file migration process 122 examines the statistical database on the primary storage 110 and determines whether files should be dynamically migrated between the primary storage 110 and the secondary storage 112. Alternatively, the file migration process 122 may migrate files between the primary storage device 110 and the file server 130 using the communications interface 114 and the local area network 115.

After the operating system 118 is initially loaded, an initialization operation within the operating system 118 checks the version of the operating system 118 against the version on secondary storage. If the version on secondary storage is newer, the user is given the option of updating the version on primary storage by overwriting files on the primary storage device with new files from the secondary storage device.

Figure 2:
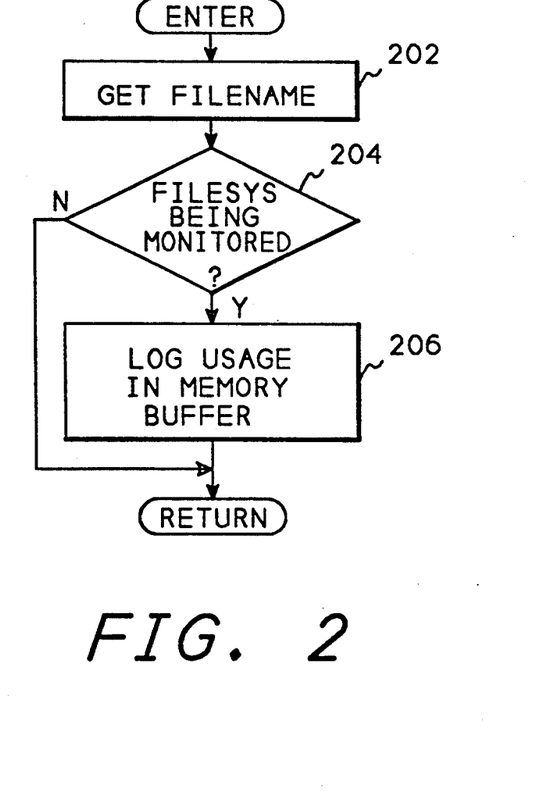
FIG. 2 shows a flowchart of the statistical collection process.

FIG. 2 shows a flow chart of the statistics collection routine 124 (FIG. 1). The statistics collection routine of FIG. 2 is typically called by a path lookup routine whenever files are accessed. That is, each time a file is accessed by a task within the operating system 118 the path lookup routine is used to determine the location of a file. After the path lookup routine has successfully located the file, it calls the statistics collection routine 124 which will update information about the file usage.

Referring now to FIG. 2, after entry, block 202 gets the file name and any other information needed to identify the file from the path lookup routine. Block 204 then determines whether the file system containing the file is being monitored. A number of file sets or file systems can be specified to the statistics collection routine and only files within those file sets or systems will be monitored. If this file is not being monitored, block 204 simply returns to its caller. If the file is being monitored, block 204 transfers to block 206 which logs usage of the file into a record within a memory buffer. This buffer will be read by the statistics summarization routine, described below.

Figure 3:
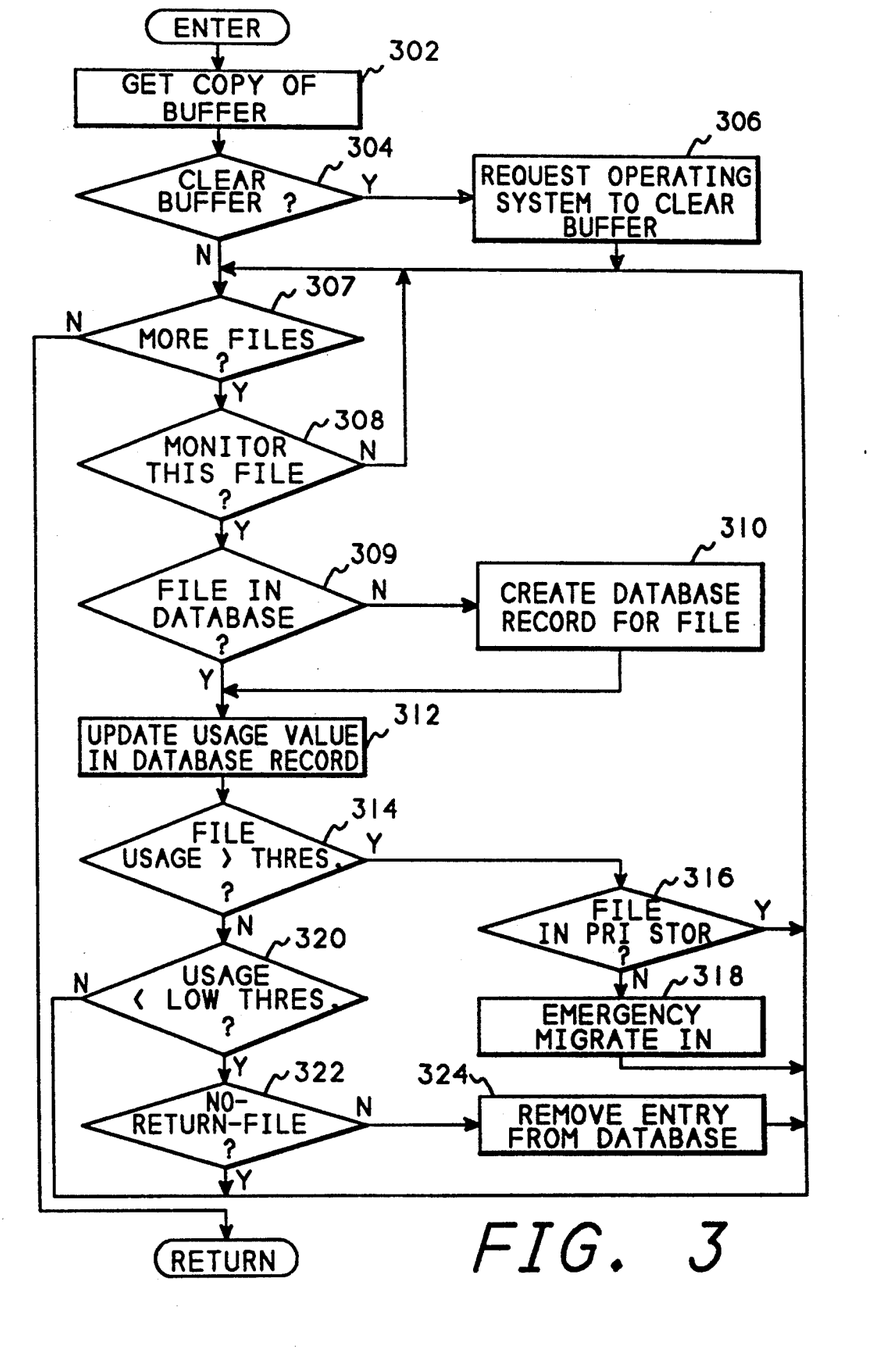
FIG. 3 shows a flowchart of the statistical summarization process.

FIG. 3 shows a flow chart of the statistics summarization process 120 (FIG. 1). This process would be scheduled periodically to summarize the statistics being collected by the statistics collection routine 124. When the statistics summarization process is scheduled, FIG. 3 receives control. Referring now to FIG. 3, after entry, block 302 requests a copy of the memory buffer records saved by block 206 (FIG. 2) from the operating system and places this data into the statistics summarization process local memory. Block 304 then determines if the memory buffer is to be cleared and if it is, block 304 transfers control to block 306 which requests that the operating system clear the memory buffer of all records, thus allowing statistics collection to restart. Alternatively, the memory buffer could be implemented as a circular list which would not require clearing. Block 307 then determines if there are more records in the local memory to be processed and, if not, returns to the caller.

If more records are in the local memory buffer, block 307 goes to block 308 which gets the next record and determines the file in the record is being monitored. Block 308 can perform a call to a user-supplied routine to filter the files being monitored. If the file is being monitored, block 308 transfers to block 309 which determines whether the file is contained in a database being maintained by the statistics summarization process If the file has not been accessed recently, it may not be in the database. If a database record does not exist for the file, block 309 transfers to block 310 which creates a database record for it. Control then transfers to block 312 which updates a usage value within the database record indicating that the file has been accessed.

This usage value may be maintained in one of several ways. A first way is to update the usage value at regular time intervals, such as once a day. When using this method, the usage value is a simple counter, indicating the number of accesses to the file that day. After updating the counter, the file migration process (described below with respect to FIG. 4) would be run, and the counters for all files would be cleared. When using this method in the preferred embodiment, a file would be migrated out if its usage was less than one time during a 24 hour period. A file would be migrated in if its usage was more than three times in a 24 hour period. These values could be easily changed by the user of the system.

Another way to maintain the usage value is to increment or decrement the value with a delta value which is derived from the number of accesses of the file in the time interval between the current time and the previous time the statistics summarization process was run. For example, if the statistics summarization is run every hour, and during the hour the file was not accessed, the usage value would be decremented by one. If the file was accessed once during the hour, the usage value would not be changed. If the file was accessed twice, the usage value would be incremented by one. If the file was accessed three times the usage value would be incremented by two, and if the file was accessed four times the usage value would be incremented by three. If the file was accessed five or more times the usage value would be incremented by four. Those skilled in the art will recognize that there are many ways of creating the delta values such as shown in the above examples. Different files may have different methods of determining the delta value and have different threshold values to activate migration.

After updating the usage value, block 314 then determines if the usage is greater than a high threshold level, and if so, block 314 transfers to block 316 which determines if the file is on the primary storage device. If the file is not in primary storage, block 316 transfers to block 318 which migrates the file to the primary storage device. If the usage is less than the high threshold value, block 314 goes to block 320 which determines if the usage is less than a low threshold value. If the usage is less than a low threshold value, block 320 goes to block 322 which determines if the file is a no-return file. If the file is not a no-return file, block 322 goes to block 324 which removes the file entry from the database.

These threshold levels are determined by the user of the system, and might be a different levels for files stored on a network device than for files stored on a disk or CDROM secondary storage device. In the preferred embodiment, an emergency migration in would occur if the file had been used more than ten times within the last 24 hours, and an entry would be removed from the database if the file has been used less than one time within the last 24 hours.

If the usage is outside the thresholds, or after migrating the file in or removing the database entry, control returns to block 307 to process the next file. After FIG. 3 is complete, the disk database contains the current history of file accesses that have been collected.

Figure 4:
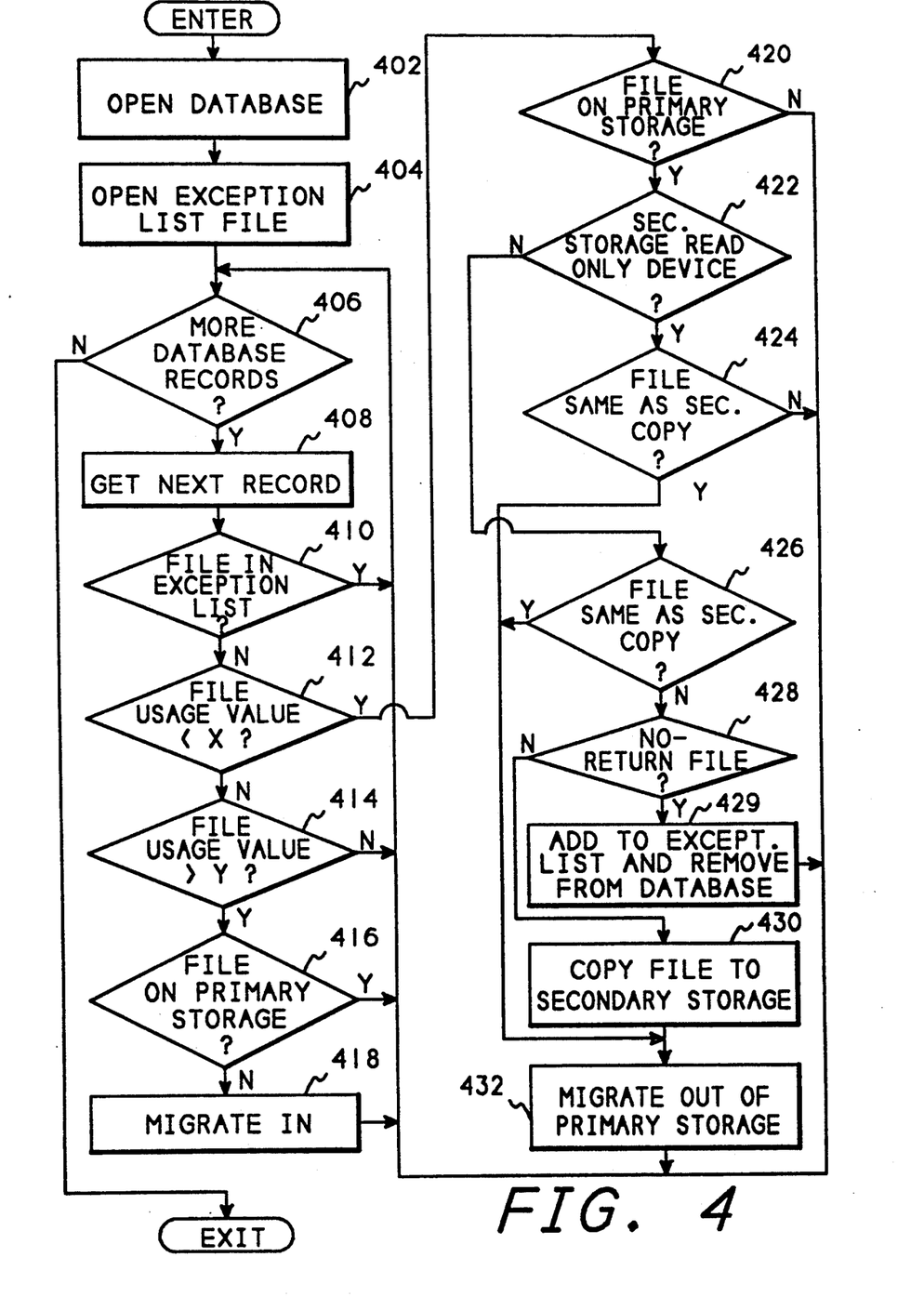
FIG. 4 shows a flowchart of the file migration process.

FIG. 4 shows a flow chart of the file migration process 122 (FIG. 1). This process would be scheduled periodically by the operating system 118. Referring now to FIG. 4, after entry, block 402 opens the database and block 404 opens and reads an exception list file. The exception list file contains a list of files that should not be dynamically migrated by the file migration process. By utilizing this file, the user is able to control which files on the system will be migrated and which files will be left untouched. Also, a flag byte is kept in each record of the database to indicate that a file should not be migrated after it is modified.

After opening the exception list file, block 404 transfers to block 406 which determines whether there are more database records to be read. If there are no more database records, control simply returns since the processing is complete. If more database records remain, block 406 transfers to block 408 which gets the next database record. Block 410 then determines whether the file within the record is in the exception list and if it is, block 410 returns to block 406 since this file is not eligible for migration. If the file is not in the exception list, block 410 transfers to block 412 which determines the number of accesses the file has had within a past predetermined time span. The user of the system may specify criteria to control the migration of files. For example, a user might specify that if a file has had zero or one accesses within the last 24 hours, it is eligible to be migrated from primary storage to secondary storage. The user might also specify that if a file has had three or more accesses within the last 24 hours the file should be migrated to primary storage. This is by way of example only, since a user may specify any criteria for selecting files to be dynamically migrated.

Block 412 determines whether the file has been accessed less than the number of times the user has set to cause a file to be dynamically migrated to secondary storage. If the file has been accessed less than "X" number of times, as specified by the user, block 412 transfers to block 420, described below.

If the file access is greater than the minimum required to cause a migrate out, block 412 transfers to block 414 which determines whether the number of file accesses are greater than a value "Y", specified by the user, as the number which would cause a file to be migrated in to primary storage. If the number of file accesses is less than or equal to "Y", block 414 returns to block 406 to process the next database record. If the number of file accesses is greater than "Y", block 414 transfers to block 416 which determines whether the file is already on primary storage and if the file is already on primary storage, block 416 transfers to block 406 to process the next database record. If the file is not on primary storage, block 416 transfers to block 418 which migrates the file from secondary storage onto primary storage before returning to block 406 to process the next database record.

If number of file accesses was less than the number required to keep the file on primary storage, block 412 transfers to block 420 to determine whether the file should be migrated out. Block 420 determines whether the file is currently located on primary storage, and if not, there is no need to migrate it out so block 420 transfers to block 406 to process the next database record. If the file is on primary storage, block 420 goes to block 422 which determines whether the secondary storage device is a read-only device such as a CDROM. If the secondary storage device is read-only, block 422 goes to block 424 which determines whether the copy on secondary storage is the same as the copy of the file on primary storage, and if they do not match, the file cannot be deleted from primary storage, so block 424 goes to block 406. If the files match, block 424 transfers to block 432 which migrates the file out by simply deleting it from primary storage and setting up a symbolic link to point to the file on secondary storage. This symbolic link is used by the operating system to re-direct access to the file on secondary storage when the user accesses the file.

If the secondary storage device is writable, block 422 transfers to block 426 which determines if the copy of the file on secondary storage matches the copy on primary storage. If the two files match, block 426 goes to block 432 which migrates the file to secondary storage. If the files do not match, block 426 goes to block 428 which determines if the file is a no-return file. The type of the file is stored in the database by the user of the system. A no-return file is defined by the user as a file that is not to be migrated out if it has been modified. If the file is no-return file, block 428 transfers to block 429 which adds this file to the exception list and removes it from the database before returning to block 406 to process the next record. If the file is not a no-return file, block 428 goes to block 430 which copies the file from primary storage to secondary storage. Block 430 then transfers to block 432 to perform the rest of the migration out process.

The statistics summarization process 120 and the file migration process 122, described above with respect to FIGS. 3 and 4, could be combined into a single process.

Figure 5:
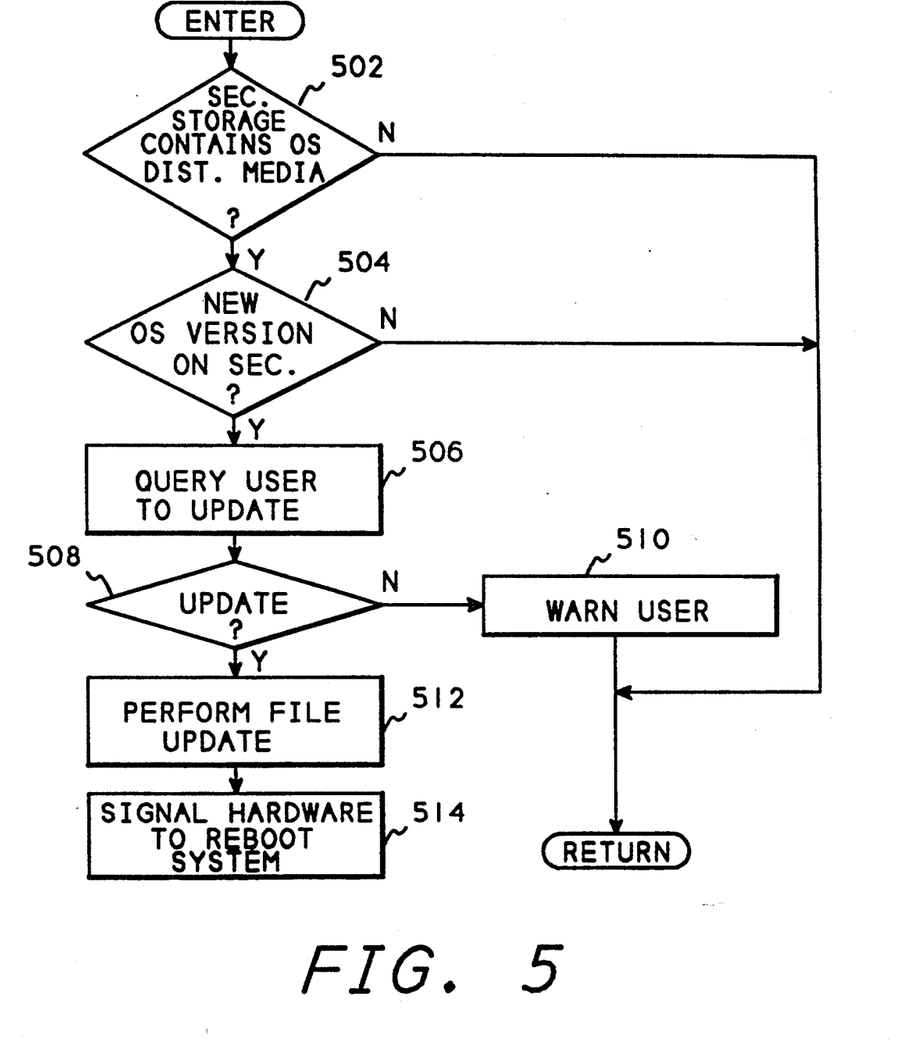
FIG. 5 shows a flowchart of the bootstrap file compare process.

FIG. 5 shows a flow chart of the initialization process within the operating system 118 (FIG. 1). The routine of FIG. 5 determines whether an operating system upgrade has occurred since the last time the operating system was loaded. If an operating system upgrade has occurred, such as by replacing the operating system files on the secondary storage device or by loading new operating system files onto the network file server, the initialization process will ask the user whether the user desires to upgrade at this time.

Referring now to FIG. 5, after entry, block 502 determines whether the secondary storage contains an operating system distribution media. Block 504 then compares the operating system version on the secondary storage to determine if a new version is contained on the secondary storage. If the primary storage is current, that is the secondary storage data is not newer than the primary storage file, block 504 returns to its caller. If the primary storage device is determined to not be current, block 504 transfers to block 506 which queries the user to ask whether the user wishes to update the operating system. If the user wishes to update the operating system, block 508 transfers to block 512 which copies the operating system onto the primary storage device and then block 514 signals the hardware to reboot the new operating system. If the user does not wish to update, block 508 transfers to block 510 to warn the user that a new version is available on the secondary storage. FIG. 5 then returns to its caller.

Having thus described a presently preferred embodiment of the present invention, it will now be appreciated that the aspects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A process for dynamically migrating a plurality of computer data files between a primary storage device and a secondary storage device, wherein said computer data files can be directly accessed from either device, said process comprising:

(a) determining a file access rate over a predetermined time period for each of said plurality of computer data files, wherein said plurality of computer data files comprises a selected subset of all computer data files on said primary storage device and said secondary storage device;

(b) migrating one of said plurality of computer data files between said primary storage device and said secondary storage device when said file access rate is different from a set of predetermined values during said predetermined time period, wherein said set of predetermined values for said one of said plurality of computer data files is independent of a set of predetermined values for any other of said plurality of computer data files, said migrating comprising the steps of (b1) immediately migrating one of said plurality of computer data files from said secondary storage device to said primary storage device when a file access rate of said one of said plurality of computer data files is greater than a first predetermined value within said set of predetermined values;

(b2) scheduling one of said plurality of computer data files for migration, at a later time, from said primary storage device to said secondary storage device when a file access rate of said one of said plurality of computer data files is less than a second predetermined value within said set of predetermines values during said predetermined time period; and (b3) scheduling one of said plurality of computer data files for migration, at a later time, from said secondary storage device to said primary storage device when a file access rate of said file is more than a third predetermined value within said set of predetermined values, but less than said first predetermined value within said set of predetermined values, during said predetermined time period; and (c) repeating step (b) for each of said plurality of computer data files.

2. The process of claim 1 wherein step (a) further comprises:
(a1) creating a usage value corresponding to each of said plurality of computer data files; and
(a2) updating said usage value each time said corresponding computer data file is accessed.

3. The process of claim 2 further comprising the steps of:
(a3) creating a computer database file with a usage value record corresponding to each of said plurality of computer data files; and
(a4) reading each of sad usage values and updating a usage value within a usage value record, wherein said usage value record corresponds to one of said plurality of computer data files for which said usage value was created.

4. The process of claim 3 wherein step (b) further comprises the step of:
(b1) reading said computer database file and using said usage value within said corresponding usage value record as said file access rate.

5. The process of claim 1 wherein step (b) further comprises the steps of:
(b1) determining if said secondary storage device is a read-only device;
(b2) if said secondary storage device is a read-only device, replacing said one of said plurality of computer data files located on said primary storage device with a symbolic link when said file access rate of said file is less than said predetermined value during said predetermined period;
(b3) if said secondary storage device is not a read-only device, copying said one of said plurality of computer data files from said primary storage device to said secondary storage device and replacing said one of said plurality of computer data files located on said primary storage device with a symbolic link when said file access rate of said file is less than said predetermined value; and
(b4) copying one of said plurality of computer data files from said secondary storage device to said primary storage device when said usage value of said file is more than a second predetermined value.

6. The process of claim 1 wherein step (a) further comprises the step of:
(a1) copying a predefined set of files from said secondary storage means to said primary storage means when said process is started.

7. A system for dynamically moving a plurality of computer data files between a primary storage device and a secondary storage device, wherein said computer data files can be directly accessed from either device, said system comprising:
means for determining a file access rate over a predetermined time period for each of said plurality of computer data files;
means for immediately migrating one of said plurality of computer data files from said secondary storage device to said primary storage device when a file access rate of said file is more than a first predetermined value;
first means for scheduling one of said plurality of computer data files for migration, at a later time, from said primary storage device to said secondary storage device when a file access rate of said file is less than a second predetermined value; and
second means for scheduling one of said plurality of computer data files for migration, at a later time, from said secondary storage device to said primary storage device when a file access rate of said file is more than a third predetermined value but less than said first predetermined value.

8. The system of claim 7 wherein said means for determining further comprises:
a plurality of usage value means, one corresponding to each of said plurality of computer data files; and
means connected to as path lookup routine for updating said one of said plurality of usage value means each time said corresponding computer data file is accessed.

9. The system of claim 8 wherein said means for determining further comprises:
computer database file means containing a plurality of usage value records, one corresponding to each of said plurality of computer data files; and
means for reaching each of said plurality of usage value means and updating a usage value from said usage value means to one of said plurality of usage value records in said computer database file, wherein said usage value record corresponds to one of said computer data files corresponding to said usage value means.

10. The system of claim 9 wherein said means for migrating, said first means for scheduling, and said second means for scheduling each further comprises:
means for reading said computer database file and using said using value of said corresponding usage value record as said file access rate.

11. The system of claim 7 wherein said first means for scheduling further comprises:
means for deleting said one of said plurality of computer data files from said primary storage device when said usage value of said file is less than said second predetermined value and when said secondary storage device is a read-only device; and
means for migrating said one of said plurality of computer data files from said primary storage device to said secondary storage device when said usage value of said file is less than said second predetermined value and when said secondary storage device is not a read-only device.

12. A system for dynamically migrating a plurality of computer data files between a storage device and a network file server, wherein said computer data files can be directly accessed either from said storage device or said network file server, said system comprising:
means for determining a file access rate over a predetermined time period for each of said plurality of computer data files, wherein said plurality of computer data files comprises a selected subset of all computer data files contained on said primary storage device and said network file server, wherein said selected subset of all computer data files comprises all files not contained within an exception list of files; and
means for moving one of said plurality of computer data files between said network file server and said primary storage device when a file access rate of said file is outside a predetermined range of values during said predetermined time period, wherein said predetermined range of values for said one of said plurality of computer data files is independent of a predetermined range of values for any other of said plurality of computer data file, wherein said means for moving further comprises:
    means for immediately migrating one of said plurality of computer data files from said network file server to said primary storage device when said file access rate of said file is more than a first predetermined value;
    means for scheduling one of said plurality of computer data files for migration at a later time, from said primary storage device to said network file server when said usage value of said file is less than a second predetermined value; and
    means for scheduling one of said plurality of computer data files for migration, at a later time, from said network filer server to said primary storage device when said usage value of said file is more than a third predetermined value but less than said first predetermined value.

13. The system of claim 12 wherein said means for determining further comprises:
    a plurality of usage value means, one corresponding to each of said plurality of computer data files; and
    means connected to a path lookup routine for updating said one of said plurality of usage value means each time said corresponding computer data file is accessed.

14. The system of claim 13 wherein said means for determining further comprises:
    computer database file means containing a plurality of usage value records, one corresponding to each of said selected computer data files; and
    means for reading each of said plurality of usage value means and updating a value from said usage value means to said one of said plurality of usage value records in said computer database file that corresponds to said computer data file.

15. The system of claim 14 wherein said means for moving further comprises:
    means for reading said computer database file and using said usage value of said corresponding record as said file access rate.

16. The system of claim 12 further comprising:
    means for copying a predefined set of files from said secondary storage means to said primary storage means when said system is started.

17. A process for dynamically migrating a plurality of computer data files between a primary storage device and a secondary storage device in a multi-processing operating system, wherein said computer data files can be directly accessed from either device, said process comprising:
    (a) determining, in a first process of said multi-processing operating system, a file access rate over a predetermined time period for each of said plurality of computer data files;
    (b) immediately migrating, in a second process of said multi-processing operating system, one of said plurality of computer data files from said secondary storage device to said primary storage device when said file access rate of said file is more than a first predetermined value;
    (c) scheduling one of said plurality of computer data files for migration, in a third process of said multi-processing operating system, from said primary storage device to said secondary storage device, when said file access rate of said one of said plurality of computer data files is less than a second predetermined value during said predetermined time period;
    (d) scheduling one of said plurality of computer data files for migration, in said third process of said multi-processing operating system, from said secondary storage device to said primary storage device, when said file access rate of said file is more than a third predetermined value, but less than said first predetermined value, during said predetermined time period; and
    (e) repeating steps (b) through (d) for each of said plurality of computer data files.

* * * * *